(12) United States Patent
Nakaya et al.

(10) Patent No.: US 8,477,751 B2
(45) Date of Patent: Jul. 2, 2013

(54) MOBILE STATION COMMUNICATION DEVICE, INTER-MOBILE STATION COMMUNICATION SYSTEM, AND INTER-MOBILE STATION COMMUNICATION METHOD

(75) Inventors: Yuuta Nakaya, Kawasaki (JP); Takeshi Takano, Kawasaki (JP); Tamio Saito, Kawasaki (JP); Makoto Yoshida, Kawasaki (JP); Takanori Iwamatsu, Kawasaki (JP); Naoyuki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 91 days.

(21) Appl. No.: 13/238,517

(22) Filed: Sep. 21, 2011

(65) Prior Publication Data

US 2012/0134336 A1    May 31, 2012

Related U.S. Application Data

(63) Continuation of application No. PCT/JP2009/001539, filed on Apr. 1, 2009.

(51) Int. Cl.
*H04Q 7/24* (2006.01)
(52) U.S. Cl.
USPC ............ 370/338; 370/342; 370/344; 370/347
(58) Field of Classification Search
USPC ....................................................... 701/408
See application file for complete search history.

(56) References Cited

U.S. PATENT DOCUMENTS

| 7,339,919 B2* | 3/2008 | Harada ......................... 370/347 |
| 2007/0198140 A1* | 8/2007 | Mudalige ......................... 701/1 |
| 2008/0162036 A1* | 7/2008 | Breed ........................... 701/207 |

FOREIGN PATENT DOCUMENTS

| JP | 2004-62381 | 2/2004 |
| JP | 2004-199348 | 7/2004 |
| JP | 2005-229478 | 8/2005 |
| JP | 2005-236836 | 9/2005 |
| JP | 2006-20116 | 1/2006 |
| JP | 2006-254215 | 9/2006 |
| JP | 2007-110359 | 4/2007 |

OTHER PUBLICATIONS

International Search Report dated Apr. 28, 2009, from corresponding International Application No. PCT/JP2009/001539.

* cited by examiner

*Primary Examiner* — Duc C Ho
(74) *Attorney, Agent, or Firm* — Katten Muchin Rosenman LLP

(57) ABSTRACT

A communication device is used by a mobile station to perform wireless communication with another mobile station. The communication device includes a processor configured to set a transmission resource according to a present position of the mobile station, the transmission resource being set based on transmission resource association information including different transmission resources assigned to plural assignment areas provided at different positions along a road through which the mobile station passes; and a transmitter configured to transmit data with the use of the transmission resource that has been set.

2 Claims, 13 Drawing Sheets

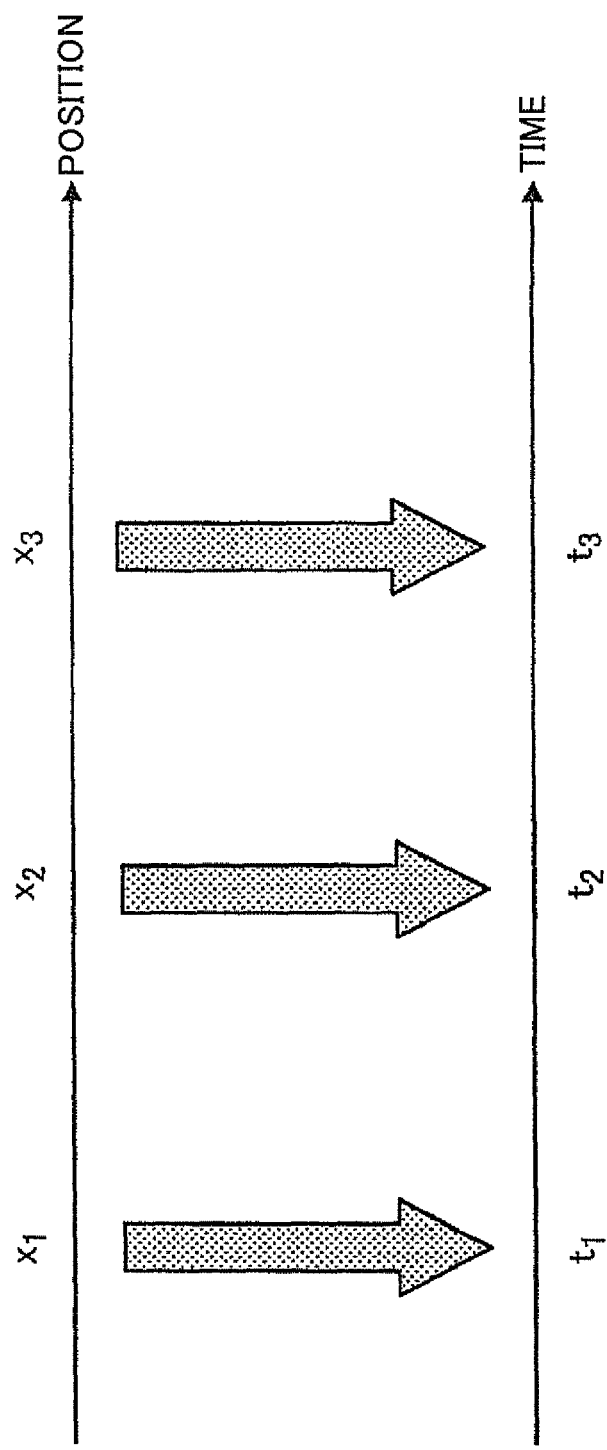

MOBILE STATION COMMUNICATION DEVICE, INTER-MOBILE STATION COMMUNICATION SYSTEM, AND INTER-MOBILE STATION COMMUNICATION METHOD

CROSS-REFERENCE TO RELATED APPLICATION

This patent application is based upon and claims the benefit of priority under 35 USC 120 and 365(c) of PCT application JP2009/001539 filed in Japan on Apr. 1, 2009, the entire contents of which are incorporated herein by reference.

FIELD

The embodiments discussed herein are related to a mobile station communication device, an inter-mobile station communication system, and an inter-mobile station communication method for a mobile station to perform wireless communication with another mobile station.

BACKGROUND

The automobile society of today has many serious problems such as traffic congestion. To solve such problems, ITS (Intelligent Transport System) has been proposed, and specific systems such as VICS (Vehicle Information Communications System) and ETC (Electronic Toll Collection System) have been put into practice.

Furthermore, in recent years, as a system relevant to ITS, an inter-vehicle communication system is attracting attention for the purpose achieving a safe automobile society. An inter-vehicle communication system is used for performing wireless communication between vehicles. An inter-vehicle communication system is different from a mobile wireless communication system in which a base station implements centralized control on mobile terminals such as mobile telephones. Specifically, in an inter-vehicle communication system, decentralized autonomous control is implemented so that the respective vehicles perform communication with each other in accordance with a certain rule. That is to say, ad hoc communication is performed. Generally, the CSMA/CA (Carrier Sense Multiple Access/Collision Avoidance) method is known as an example of a decentralized autonomous control system, and the CSMA/CA method is proposed as an inter-vehicle communication system.

In the CSMA/CA method, it is confirmed whether a communication path including a carrier frequency has not been continuously used for more than a certain time period, with the use of a received power level (carrier sense). When the confirmation result indicates that the communication path has not been used, a vehicle uses the communication path to transmit data. At the stage of carrier sensing, when it is confirmed that the communication path is used, i.e., the received power level exceeds the carrier sense level, waiting is employed until usage of the communication path ends. Subsequently, when it is confirmed that usage of the communication path has ended, a vehicle starts transmission after a random waiting time passes. Transmission is started after a random waiting time passes because if a vehicle starts transmission immediately after usage of the communication path ends, there is a high possibility that the transmission collides with that from another vehicle.

In the above method, when the number of vehicles attempting to perform communication is less than or equal to a certain number, the receiving throughput increases, and inter-vehicle communication is performed with good performance. However, when the number of vehicles attempting to perform communication exceeds the certain number, the following hidden terminal problem arises.

The hidden terminal problem arises as follows. Two vehicles are located outside each other's communication range, and are thus located outside the target of carrier sensing. These two vehicles transmit data at the same time with the use of the same communication path. A receiving vehicle is located at a position where communication can be performed with the two transmitting vehicles. In this situation, the data signals from the two transmitting vehicles collide with each other. This problem is referred to as a hidden terminal problem. As a measure to counter this hidden terminal problem, an RTS/CTS (Request to Send/Clear to Send) method may be used. However, the RTS/CTS method is effective when a large amount of data is transmitted. The RTS/CTS method is ineffective when transmitting a relatively small amount of data as in inter-vehicle communication.

Japanese Laid-Open Patent Publication No. 2004-062381 describes an inter-vehicle communication device that smoothly performs inter-vehicle communication at intersections. The inter-vehicle communication device acquires the present position information of the vehicle in which the device is installed (self vehicle), and also selects a communication channel used for transmitting wireless signals from the present position of the self vehicle with the use of map information including the association between positions, roads, and communication channels. Specifically, it is described that communication channels are assigned to roads connected to intersections, so that inter-vehicle communication is smoothly performed at intersections (see paragraph (0015) of Japanese Laid-Open Patent Publication No. 2004-062381).

Furthermore, Japanese Laid-Open Patent Publication No. 2006-254215 describes an inter-vehicle communication device for supporting a vehicle to pass through a road where it is difficult for two vehicles to pass by each other. The inter-vehicle communication device assigns different diffusion codes for transmission to the respective roads, and transmits information to other vehicles with the use of these diffusion codes.

However, with the above-described devices, communication channels and diffusion codes are assigned to the respective roads. Therefore, the above devices are not capable of solving a hidden terminal problem arising in the same road.

SUMMARY

According to an aspect of the present invention, a communication device used by a mobile station to perform wireless communication with another mobile station, the communication device includes: a processor configured to set a transmission resource according to a present position of the mobile station, the transmission resource being set based on transmission resource association information including different transmission resources assigned to plural assignment areas provided at different positions along a road through which the mobile station passes; and a transmitter configured to transmit data with the use of the transmission resource that has been set.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6 illustrates a transmission resource used by the inter-vehicle communication device of FIG. 2;

DESCRIPTION OF EMBODIMENTS

Figure 1:
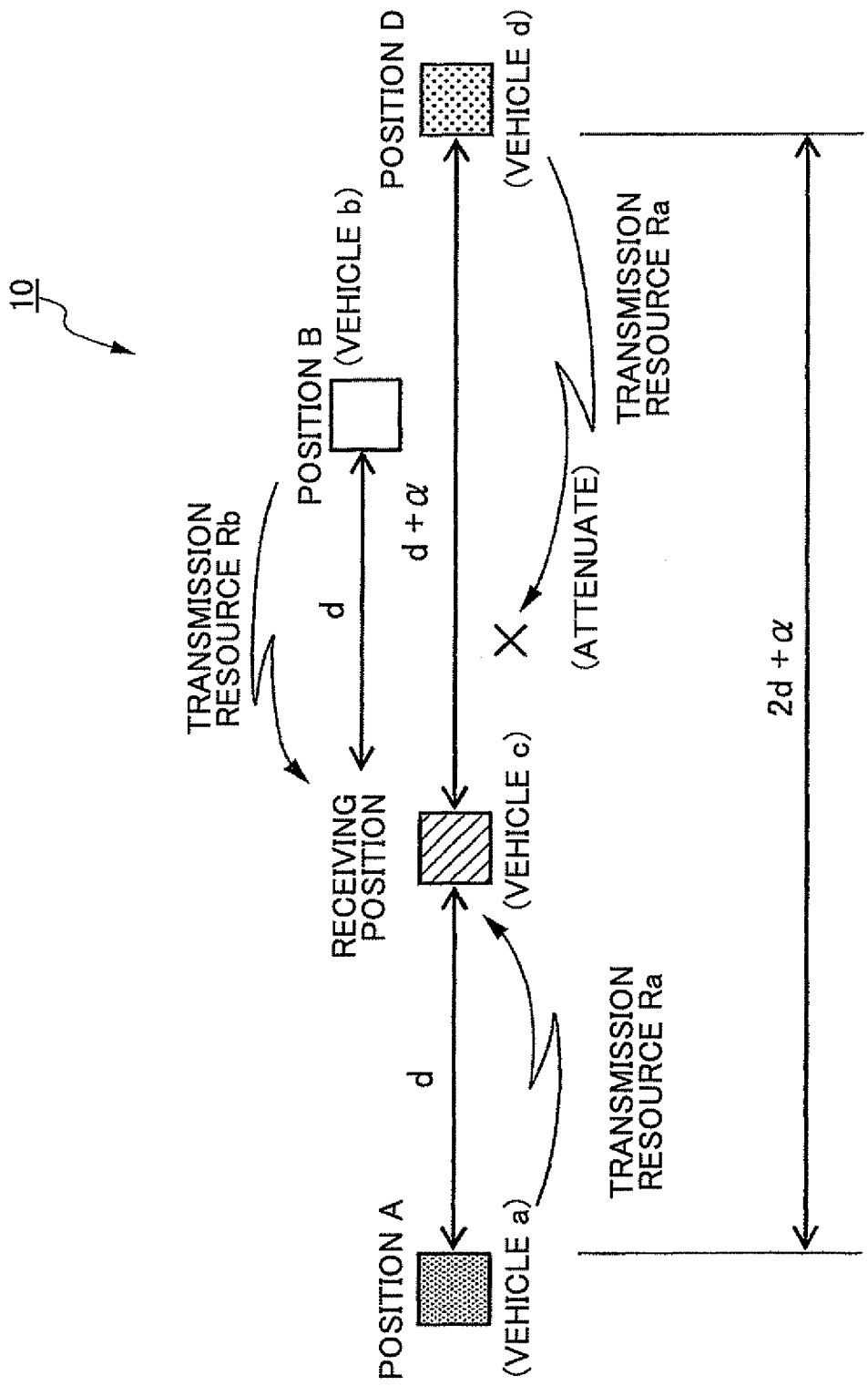
FIG. 1 is a schematic diagram of an inter-vehicle communication system according to an embodiment of an inter-mobile station communication system.

A mobile station communication device, an inter-mobile station communication system, and an inter-mobile station communication method according to preferred embodiments of the present invention will be explained with reference to accompanying drawings. FIG. 1 is a schematic diagram of an inter-vehicle communication system 10 corresponding to an inter-mobile station communication system according to an embodiment of the present invention. In the following description, a vehicle equipped with a communication device for performing wireless communication with another vehicle is given as an example of a mobile station. The mobile station is not limited to a vehicle that performs wireless communication with another vehicle; the mobile station may be various communication devices that move along a road.

Overview of Inter-Vehicle Communication System

The inter-vehicle communication system 10 includes plural assignment areas corresponding to different positions along a road, and assigns different transmission resources to the respective assignment areas. When a vehicle is located at a particular assignment area, the inter-vehicle communication device installed in the vehicle performs transmission with the use of the transmission resource assigned to the particular assignment area. A road may be a road extending between intersections. That is to say, there may be plural assignment areas provided along a road extending between intersections. As illustrated in FIG. 1, a vehicle a located at an assignment area at a position A on a linear road uses a transmission resource Ra to perform transmission, a vehicle b located at an assignment area at a position B uses a transmission resource Rb to perform transmission, and a vehicle c receives the transmission data from the vehicle a and the vehicle b. In this case, the vehicles a and b use different transmission resources, and therefore the two sets of transmission data are received at the vehicle c without colliding into each other. That is to say, the hidden terminal problem does not occur. In FIG. 1, d indicates the distance set for transmitting and receiving data in communication performed between the receiving position and the positions A and B. This distance d is the communication distance specified for preventing vehicles from colliding into each other. Communication can be performed between the vehicles a and b and the vehicle c, which are separated by this transmission/reception distance d. As a matter of course, communication can be performed even if the distance is shorter than the transmission/reception distance d. The transmission/reception distance d is, for example, 80 m.

Meanwhile, transmission resources are limited, and therefore the transmission resources are repeatedly used in the inter-vehicle communication system 10. Specifically, different resources are assigned within a predetermined area, and the same transmission resources as those within the predetermined area are assigned to the area outside the predetermined area. In this case, as illustrated in FIG. 1, a distance $2d+\alpha$ is provided between the assignment areas of positions A and D, which both use the same transmission resource Ra. That is to say, the distance $2d+\alpha$, which is greater than two times that of the distance d, is provided between the assignment area of position A and the assignment area of position D that are both assigned with the same transmission resource Ra. In this case, $\alpha$ indicates that communication is possible when the distance is d, but communication is not possible when the distance is $d+\alpha$. Accordingly, from the viewpoint of the receiving position of vehicle c, the transmission data from the position D is sufficiently attenuated because the position D is spaced apart from the vehicle c by a distance $d+\alpha$. Thus, the transmission data from the position D does not collide with the transmission data from the position A. Accordingly, even if the positions A and D use the same transmission resource Ra, there is no problem. As the transmission resources are limited, it is not possible to unlimitedly extend the distance between assignment areas using the same transmission resource. The upper limit of the distance is determined in accordance with the size of the transmission resource.

The distance $\alpha$ changes in accordance with multilevel modulation and the code rate. For example, in the case of QPSK, the level of the SINR (Signal Input Noise Ratio) that can be received is lower than that of 16 QAM, and therefore the value of $\alpha$ can be reduced. Furthermore, when reception methods such as turbo codes, LDPC (Low-Density Parity-Check) codes, STTC (Space Time Trellis Code), and STBC (Space Time Block Code) are used, the value of $\alpha$ can be reduced. Thus, by setting the value of $\alpha$ in advance and appropriately setting multilevel modulation and the code rate, it is possible to establish the inter-vehicle communication system 10 such that communication is possible when the distance is d and communication is not possible when the distance is $d+\alpha$.

The assignment area to which a transmission resource is assigned may be a three dimensional area including the height of the road in consideration of highways in urban cities, or a two-dimensional area on a regular road in suburban towns.

Furthermore, the assignment area may be determined based on at least one of a position (latitude, longitude) and a height (altitude) by using a predetermined position as a reference position, as in GPS (Global Positioning System). Alternatively, the assignment area may be determined based on navigation map data in consideration of a planar road in suburban towns.

In the example of FIG. 1, the vehicles are positioned along a linear line. However, the inter-vehicle communication system 10 is also applicable to a case where the vehicles are positioned on roads extending two-dimensionally, as described below with reference to FIG. 10. For example, it is assumed that the transmission/reception distance d set for performing transmission/reception between vehicles is specified in consideration of preventing vehicles from colliding into each other at intersections. In this case, the plural assignment areas, to which different transmission resources assigned, are provided within a first area. In a second area provided outside the first area, there are assignment areas to which the same transmission resources as those used in the first area are assigned. In this case,
the distance set between an assignment area in the first area and an assignment area in the second area using the same transmission resource is $2d+\alpha$, i.e., or at least greater than two times that of the transmission/reception distance d. As the transmission resources are limited, it is not possible to unlimitedly extend the distance between assignment areas using the same transmission resource. The upper limit of the distance is determined in accordance with the size of the transmission resource.

Configuration of Inter-Vehicle Communication Device

Figure 2:
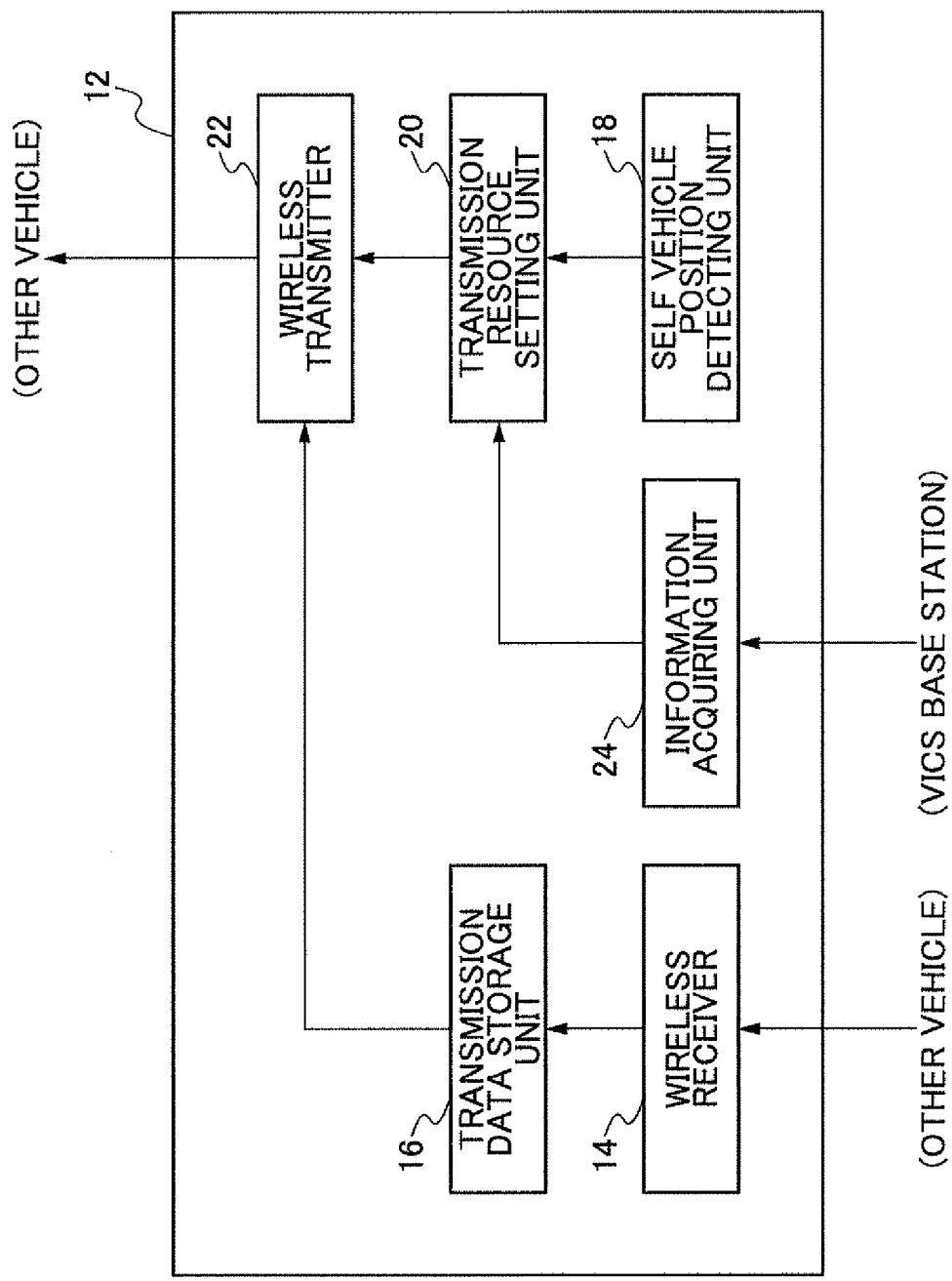
FIG. 2 schematically illustrates a configuration of an inter-vehicle communication device installed in each vehicle, used in the inter-vehicle communication system of FIG. 1.

FIG. 2 schematically illustrates a configuration of an inter-vehicle communication device 12 installed in each vehicle, used in the inter-vehicle communication system 10.

The inter-vehicle communication device 12 includes a receiver 14, a transmission data storage unit 16 which may be realized by a memory, a self vehicle position detecting unit 18, a transmission resource setting unit 20, a transmitter 22, and an information acquiring unit 24. The functions of the self vehicle position detecting unit 18, the transmission resource setting unit 20, and the information acquiring unit 24 may be implemented as one or more processors such as, e.g., Central Processor (CPU) or a combination of such one or more processors and a memory.

The receiver 14 receives data transmitted from another vehicle with the use of a transmission resource. The received data is supplied to the transmission data storage unit 16.

The transmission data storage unit 16 performs a predetermined process on the received data supplied from the receiver 14, generates transmission data according to the processing result, and temporarily stores the transmission data.

The self vehicle position detecting unit 18 detects the present position of the vehicle in which the inter-vehicle communication device 12 is installed (self vehicle). The self vehicle position detecting unit 18 may be configured to detect the present position with the use of GPS. Alternatively, in addition to using GPS, the self vehicle position detecting unit 18 may be configured to detect the precise present position by measuring the speed of the vehicle by speed pulses and detecting the direction in which the vehicle is moving with the use of a gyroscope. The information indicating the detected present position is supplied to the transmission resource setting unit 20.

Figure 3:
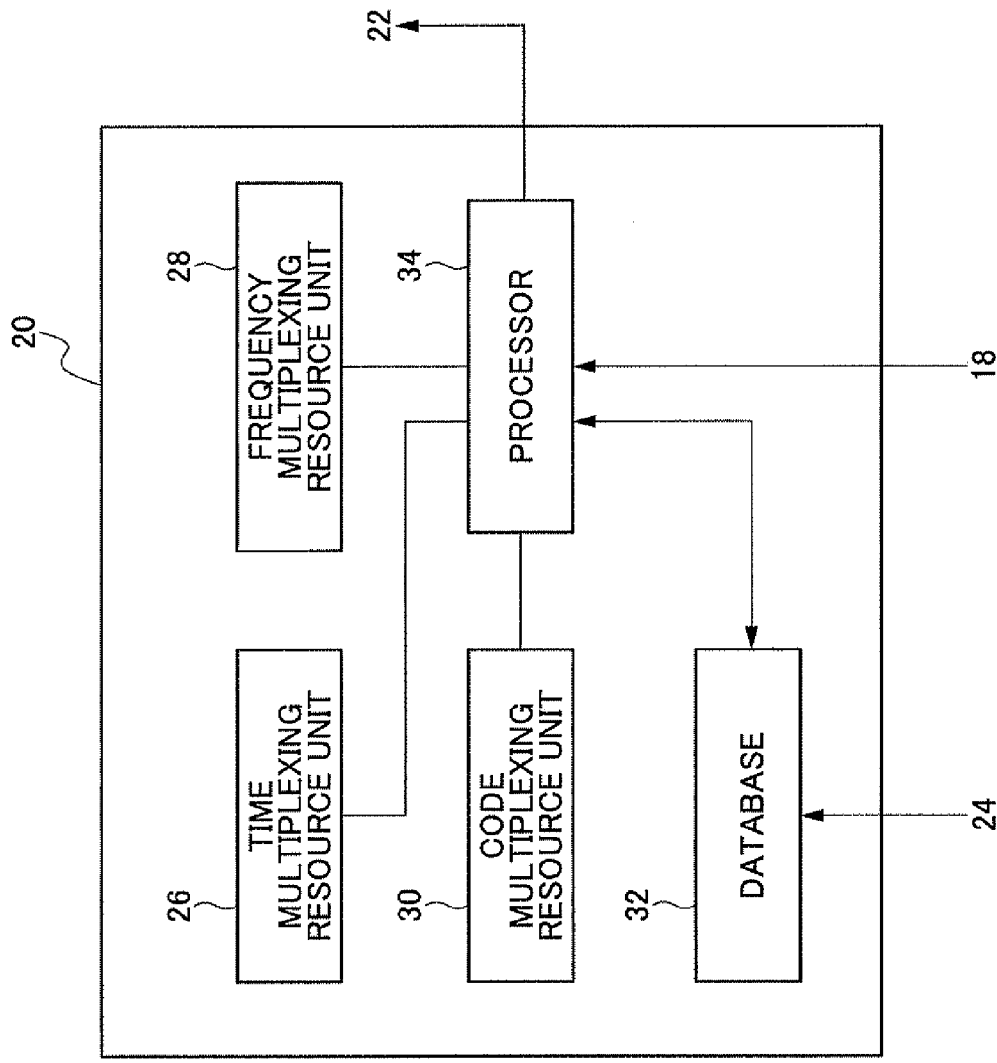
FIG. 3 illustrates a configuration of a transmission resource setting unit of the inter-vehicle communication device of FIG. 2.

The transmission resource setting unit 20 stores transmission resource association information in which different transmission resources are assigned to the respective assignment areas. With the use of this transmission resource association information, the transmission resource setting unit 20 sets a transmission resource in accordance with the information indicating the present position supplied from the self vehicle position detecting unit 18. The transmission resource is determined with the use of at least one method among time division multiplexing, frequency division multiplexing, and code division multiplexing. FIG. 3 illustrates a configuration of the transmission resource setting unit 20. The transmission resource setting unit 20 includes a time multiplexing resource unit 26, a frequency multiplexing resource unit 28, a code multiplexing resource unit 30, a database 32, and a processor 34.

The time multiplexing resource unit 26 stores communication control information for the time division multiplexing method, and provides the communication control information to the processor 34 according to a request from the processor 34.

The frequency multiplexing resource unit 28 stores communication control information for the frequency division multiplexing method, and provides the communication control information to the processor 34 according to a request from the processor 34.

The code multiplexing resource unit 30 stores communication control information for the code division multiplexing method, and provides the communication control information to the processor 34 according to a request from the processor 34.

The database 32 stores transmission resource association information in which information of different transmission resources are assigned to the respective assignment areas. In response to an inquiry from the processor 34, the database 32 extracts information of a transmission resource and provides the extracted information of a transmission resource to the processor 34.

The processor 34 inquires the database 32 about the transmission resource, by providing the database 32 with information indicating the present position supplied from the self vehicle position detecting unit 18. As a response to the inquiry, the processor 34 receives information of the transmission resource according to the present position, from the database 32. Furthermore, the processor 34 uses the information of the transmission resource to receive communication control information relevant to the transmission resource, from at least one unit selected from among the time multiplexing resource unit 26, the frequency multiplexing resource unit 28, and the code multiplexing resource unit 30. When the transmission resource combines two or more resources from among a time multiplexing resource, a frequency multiplexing resource, and a code multiplexing resource, the two sets of communication control information that have been provided are combined together into one set of communication control information at the processor 34. Accordingly, the transmission resource is set.

The communication control information that has been provided to the processor 34 or the communication control information that has been combined together at the processor 34 is provided to the transmitter 22.

The transmitter 22 transmits data with the use of the set transmission resource. Specifically, the transmitter 22 calls the transmission data stored in the transmission data storage unit 16, generates carrier wave signals using the communication control information determined at the transmission resource setting unit 20 based on the transmission data, and performs wireless transmission from an antenna (not illustrated).

Figure 4:
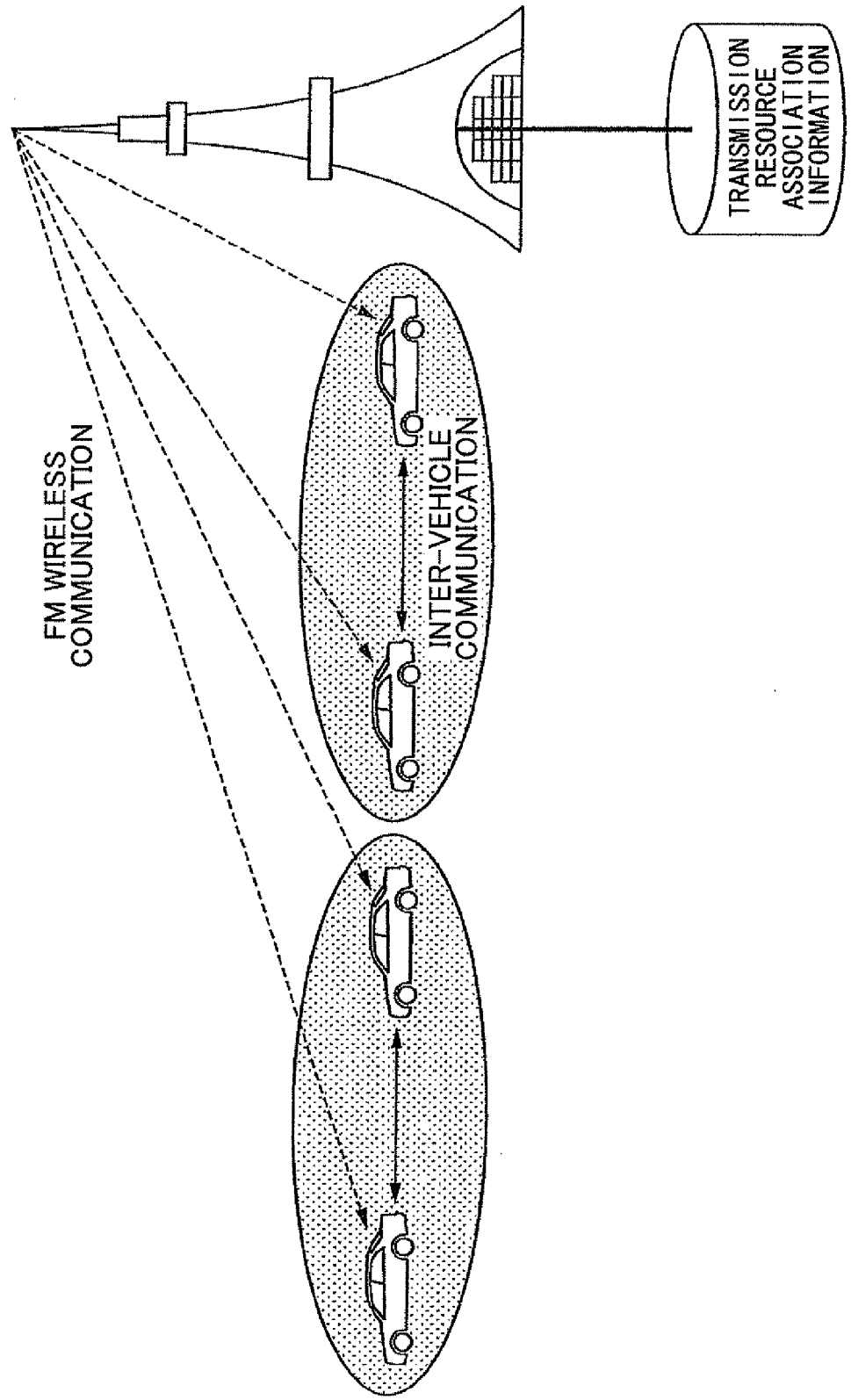
FIG. 4 illustrates a method of acquiring transmission resource association information performed by the inter-vehicle communication device of FIG. 2.

The information acquiring unit 24 downloads the transmission resource association information from an external device. For example, as illustrated in FIG. 4, the information acquiring unit 24 acquires the transmission resource association information that is included in VICS information transmitted from a VICS base station with the use of FM wireless communication.

Furthermore, the information acquiring unit 24 may acquire, as VICS information, emergency information indicating that a particular vehicle such as an emergency vehicle is located nearby, when an emergency vehicle such as an ambulance, a police car, and a fire engine is located within a predetermined range centering around the present position of the self vehicle under an emergency. In this case, the information acquiring unit 24 acquires transmission resource association information corresponding to an emergency. The information acquiring unit 24 provides the acquired transmission resource association information corresponding to an emergency to the database 32 to be stored therein. Then, the information acquiring unit 24 reports to the transmission resource setting unit 20 that the emergency information has been acquired, and instructs the transmission resource setting unit 20 to switch the transmission resource association information to transmission resource association information corresponding to an emergency. Accordingly, the transmission resource setting unit 20 sets the transmission resource corresponding to an emergency without obstructing the communication performed by a particular vehicle such as an emergency vehicle. When the information acquiring unit 24 acquires information cancelling the emergency, the transmission resource setting unit 20 switches the transmission resource association information of an emergency to the previous transmission resource association information.

The inter-vehicle communication device 12 has the above-described configuration.

Description of Wireless Communication Method

Figure 5A:
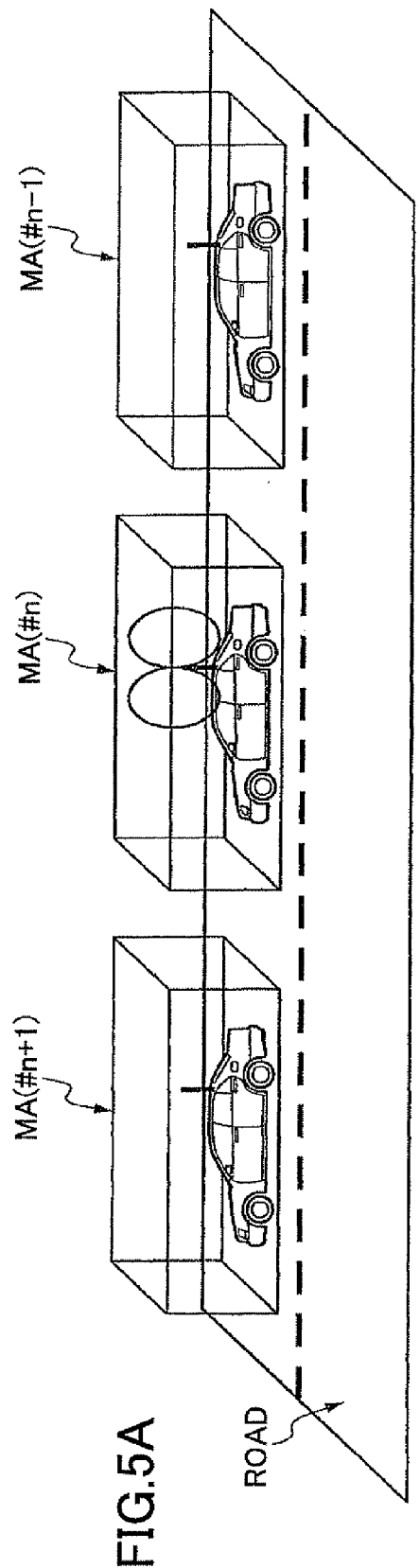
FIGS. 5A and 5B illustrate assignment areas used by the inter-vehicle communication system of FIG. 1.
Figure 5B:
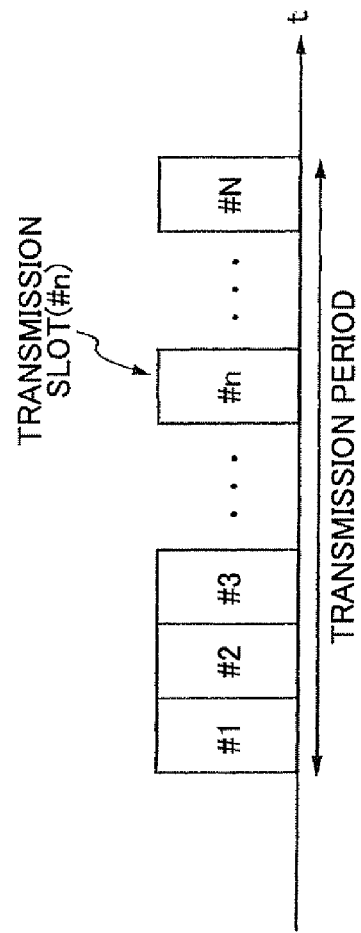

FIGS. 5A and 5B illustrate assignment areas used in wireless communication. In FIG. 5A, assignment areas MA(#n−1), MA(#n), and MA(#n+1) are provided along a road. In FIG. 5A, the assignment areas MA are arranged with constant intervals. However, the assignment areas MA may be arranged to be in contact with adjacent assignment areas MA. The assignment areas MA are sized to accommodate a vehicle having a size set by traffic regulations. Specifically, the assignment area MA has a length that is 1 through 10 times that of the maximum length of a vehicle, a width that is at least the maximum width of a vehicle but less than the width of a single traffic lane of a road. Thus, when a road has two lanes, each lane is provided with an assignment area MA.

The self vehicle position detecting unit 18 of the inter-vehicle communication device 12 detects the present position of the self vehicle. Next, the transmission resource setting unit 20 uses the transmission resource association information stored in the database 32 to detect the assignment area in which the self vehicle is located based on the detected present position. According to the detection result, the transmission resource setting unit 20 sets the transmission resource.

Next, the transmitter 22 uses the set transmission resource to call the transmission data stored in the transmission data storage unit 16 and transmits the transmission data.

FIG. 5B illustrates an example where a transmission resource is set according to time division multiplexing. Different transmission slots are assigned to the assignment areas MA(#n−1), MA(#n), and MA(#n+1). For example, when the self vehicle is positioned in the assignment area MA(#n), the transmission slot (#n) is set to perform wireless communication. In this case, the assignment number of the transmission slot is set as communication control information. Thus, for another vehicle located in the assignment area MA(#n+1), a transmission slot (#n+1) is assigned. Therefore, the transmission data from the assignment area MA(#n) and the transmission data from the assignment area MA(#n+1) do not collide with each other at the receiving vehicle. For example, assuming that the transmission period is 100 m/sec, the transmission data amount is 100 bytes, the usage bandwidth of the frequency is 8 MMz, the total number N of transmission slots is 1000 by a predetermined multilevel modulation method, so that a sufficient number of transmission slots are ensured. That is to say, as illustrated in FIG. 6, the transmission times $t_1, t_2, t_3, \ldots$ are set for the positions of the respective assignment areas $x_2, x_3, \ldots$, so that the data items do not interfere with each other. In this case, the inter-vehicle communication devices 12 in the respective vehicles are managed to perform transmission according to common time points set by GPS, etc.

The above-described method is also applicable to frequency division multiplexing and code division multiplexing.

As described above, in the inter-vehicle communication system 10, plural assignment areas are provided at different positions along a road. The inter-vehicle communication device 12 stores transmission resource association information in which different transmission resources are assigned to the respective assignment areas, and uses the transmission resource association information to set the transmission resource according to the detected present position. Furthermore, the inter-vehicle communication device 12 transmits transmission data with the use of the set transmission resource. Thus, the inter-vehicle communication system 10 solves the hidden terminal problem that is not resolved in the conventional technology.

Furthermore, the same transmission resource as that used in a first assignment area can be assigned to a second assignment area that is located far enough from the first assignment area that electric waves are attenuated and interference does not occur. Accordingly, it is possible to efficiently make use of limited transmission resources.

Example

The following simulation was performed to confirm the effects of the inter-vehicle communication system 10.

Figure 7:
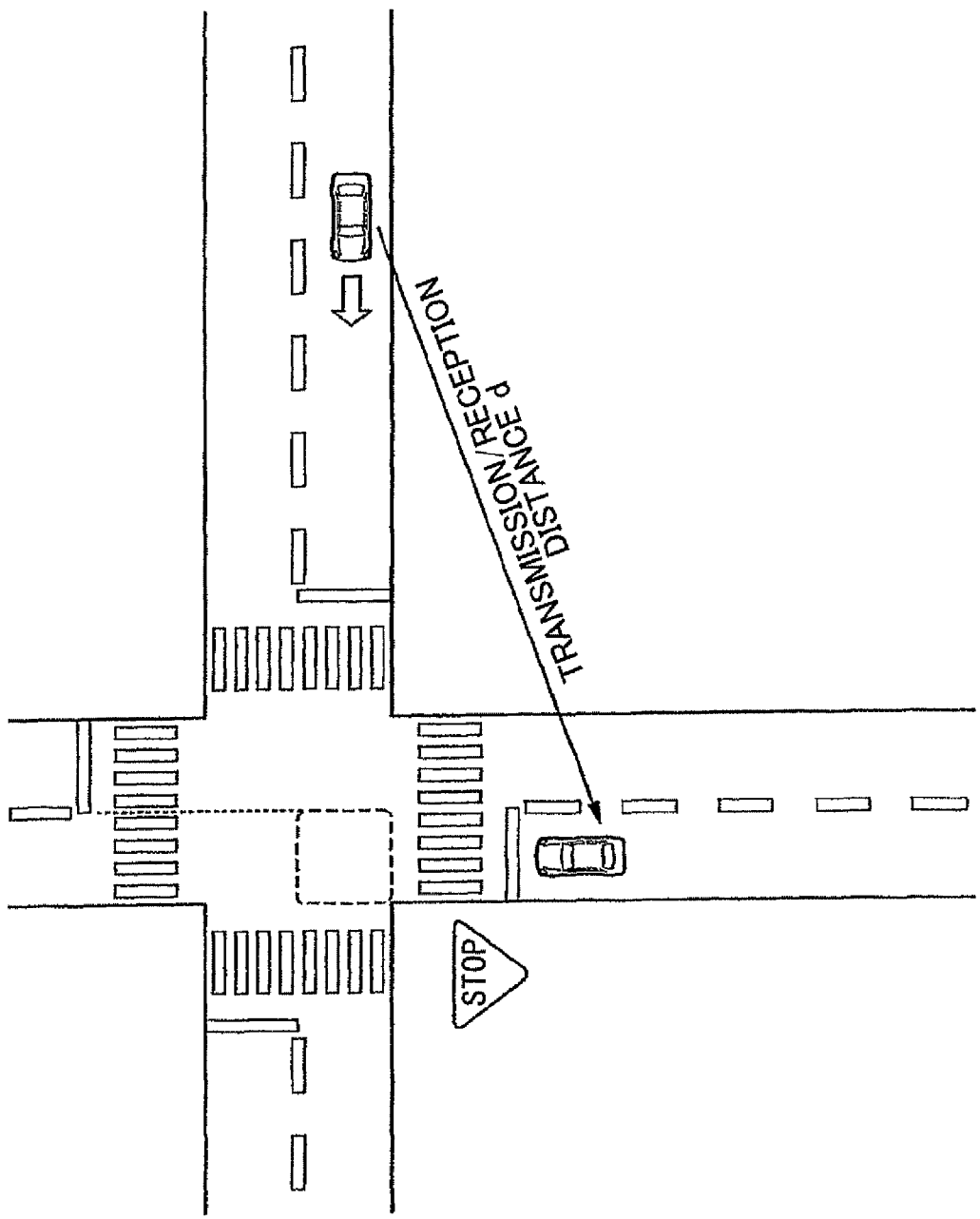
FIG. 7 illustrates an application example of the inter-vehicle communication system of FIG. 1.

First, as illustrated in FIG. 7, the transmission/reception distance d of 80 m is set for performing communication between vehicles to prevent vehicles from colliding at an intersection. Meanwhile, the distance corresponding to α indicated in FIG. 1 is 40 m. That is to say, the distance $2d+\alpha$ between assignment areas using the same transmission resource is 200 m. Accordingly, in the inter-vehicle communication system 10, transmission/reception can be performed at a distance d=80 but not at a distance d+α=120 m.

Figure 8:
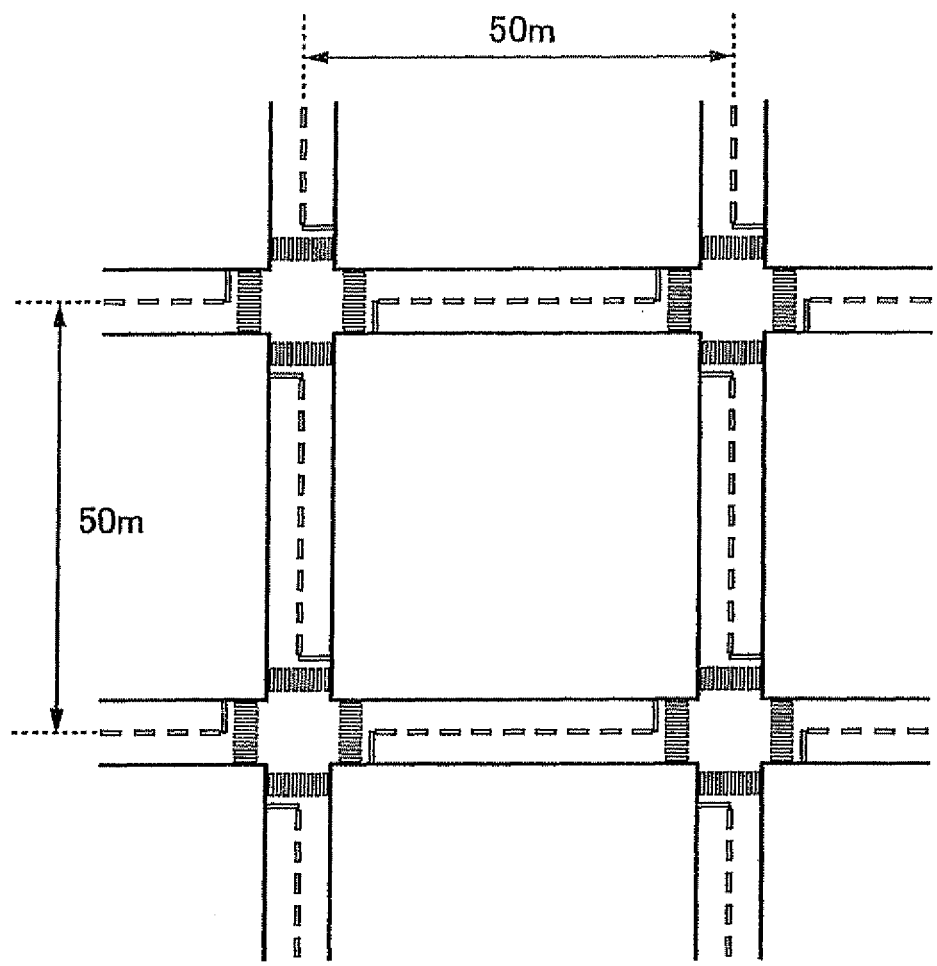
FIG. 8 illustrates a road model used in a simulation performed by the inter-vehicle communication system of FIG. 1.

Meanwhile, as the road model, roads of 50 m are orderly sectioned and laid out two-dimensionally like a grid pattern, as illustrated in FIG. 8. The transmission resources assigned to the assignment areas are determined by time division multiplexing. Specifically, it is assumed that the transmission period is 100 m/sec, the transmission data amount is 100 bytes, and the usage bandwidth of the frequency is 8 MMz. The total number C of slots is expressed by the following equation.

$$C = \text{(frequency usage efficiency)} \times \text{(usage bandwidth)} \times \text{(transmission period)}/\text{(transmission data amount per vehicle)}$$

The frequency usage efficiency is a value that is determined by a method such as multilevel modulation and the code rate.

Figure 9:
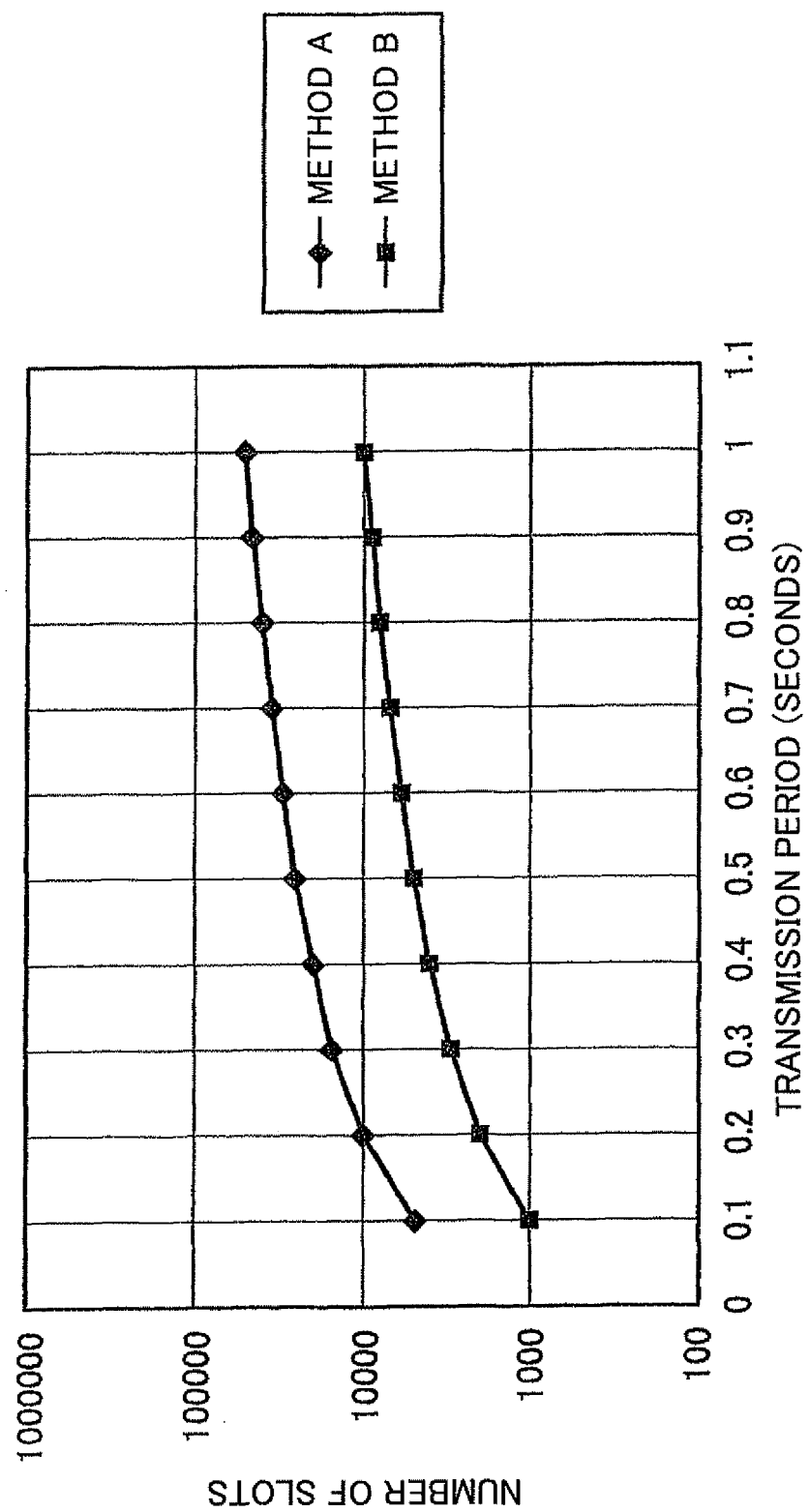
FIG. 9 is a graph indicating the relationship between the transmission period and the number of slots when simulation is performed by the inter-vehicle communication system of FIG. 1.

FIG. 9 is a graph indicating the relationship between the transmission period and the number of slots according to methods A and B. Different types of multilevel modulation methods and different code rates are applied to methods A and B. In the method A, the multilevel modulation method is 64 QAM and the code rate is ⅚. In the method B, the multilevel modulation method is QPSK and the code rate is ½. In the following, the method B (QPSK-½) is applied, and the total number C of slots is 1000 when the transmission period is 100 m/sec.

The assignment areas to which transmission slots are assigned are arranged along the roads that are 50 m long. Each assignment area is a square having a length of 4.55 m and a width of 4.55 m. As illustrated on the left side of FIG. 10, assignment areas MA(1) through MA(40) are provided along four roads. This is extended as illustrated on the right side of FIG. 10 where assignment areas MA(1) through MA(640) are indicated. Transmission slots #1 through #640 (N=1000) as illustrated in FIG. 5B are assigned to the assignment areas MA(1) through MA(640).

Figure 11:
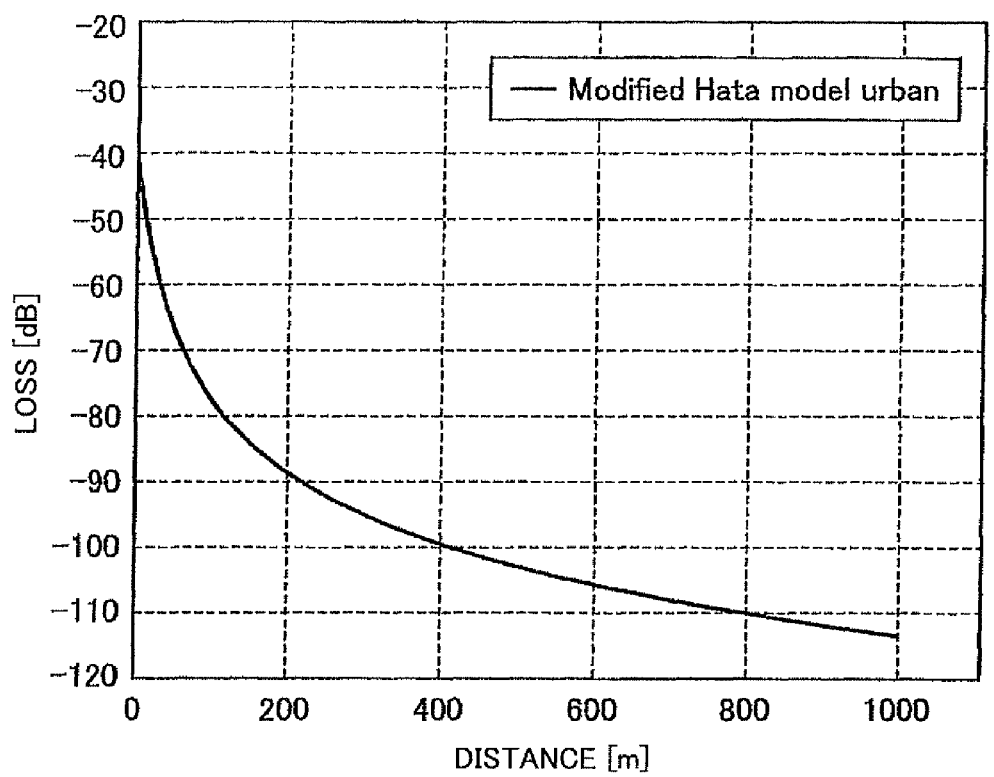
FIG. 11 illustrates electric wave loss properties used in a simulation performed by the inter-vehicle communication system of FIG. 1.

Meanwhile, the Modified Hata model for urban areas illustrated in FIG. 11, which is a known method, is used to consider the loss according to attenuation of electric waves with respect to the transmission/reception distance.

The following parameters are used in the simulation.

Figure 10:
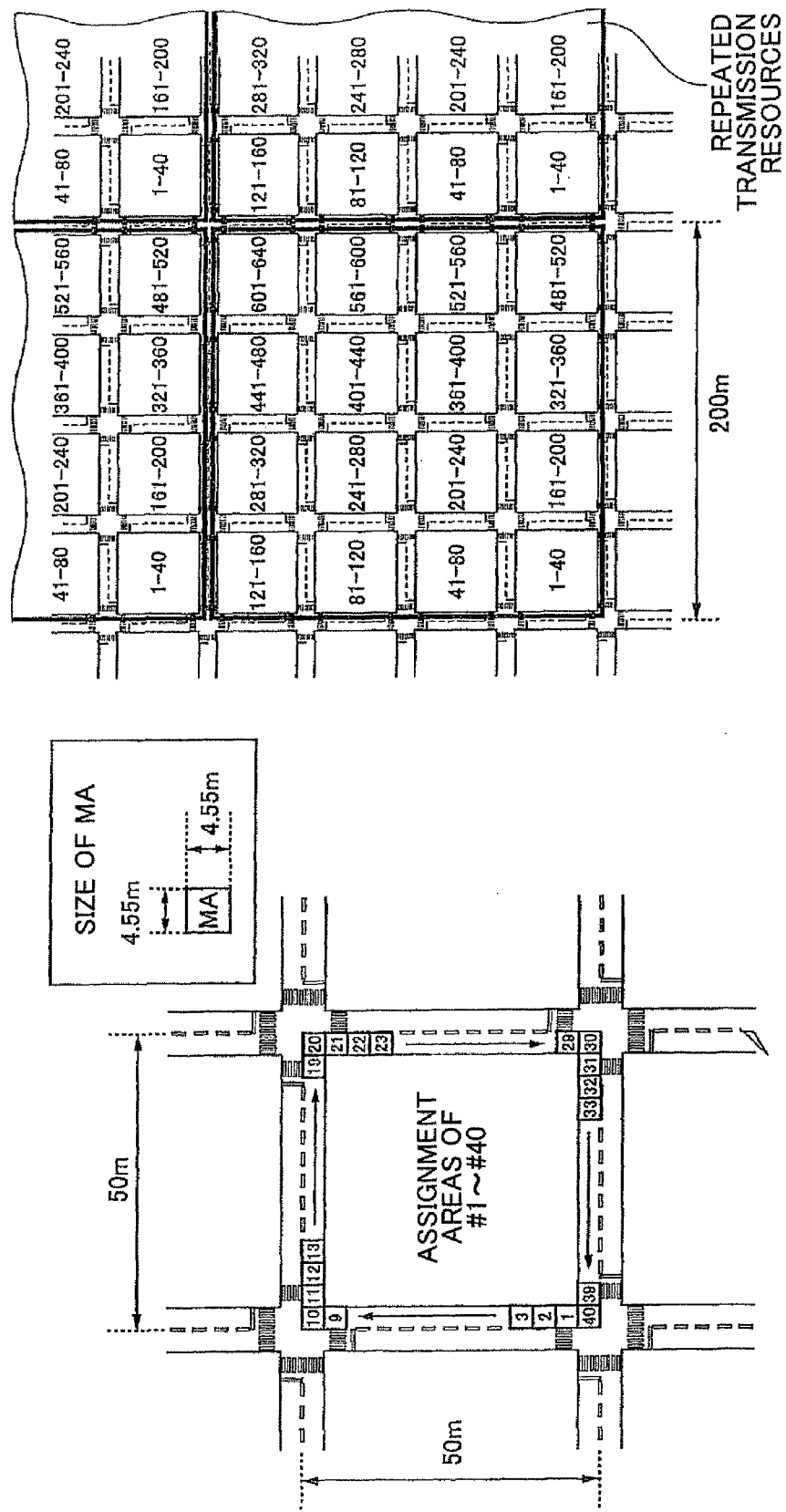
FIG. 10 illustrates an arrangement of assignment areas used in a simulation performed by the inter-vehicle communication system of FIG. 1.

| | |
|---|---|
| transmission power | 20 dBm |
| transmission data amount | 100 byte |
| transmission period | 100 m/sec |
| road model | FIG. 10 |
| propagation mode | FIG. 11 |
| communication distance d | 80 m |
| distance α | 40 m |
| antenna configuration | 1 × 2 (SIMO) |
| modulation method | modulation method B |
| carrier frequency | 700 MHz |
| bandwidth | 8 MHz |
| NF (noise factor) | 8 dB |
| SINR | 3 dB |

According to the simulation using the above parameters, the transmission data transmitted from a vehicle that is at a transmission/reception distance d=80 m from the receiving vehicle is properly received. Meanwhile, the transmission data transmitted from a vehicle that is at a transmission/reception distance d+α=120 m from the receiving vehicle is not properly received.

Figure 12:
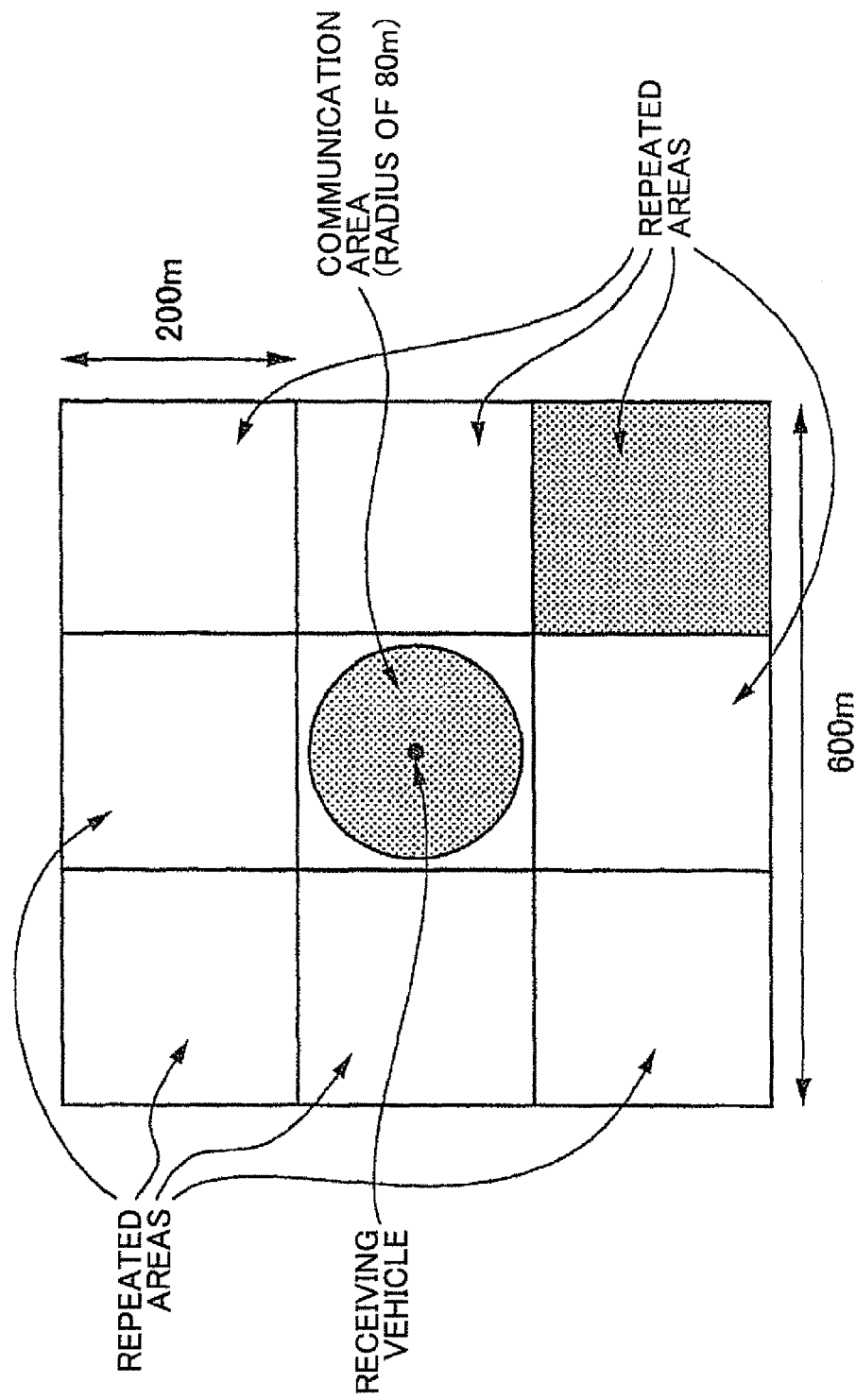
FIG. 12 illustrates an evaluation method used in a simulation performed by the inter-vehicle communication system of FIG. 1.

The total throughput received in the above model is calculated according to the simulation. Specifically, a road model of 600 m×600 m as illustrated in FIG. 12 is used. In this road model, there is an area of 200 m×200 m. Around this area, there are eight repeated areas to which the same transmission resources are assigned. The receiving vehicle is located at the center position of this road model. The total throughput (Mbps) of the transmission data that the receiving vehicle receives from transmitting vehicles, when the number of vehicles in this road model is varied, is calculated by simulation. The vehicles in this road model are arranged equidistantly.

The number D of vehicles from which data is received in this simulation can be calculated with the use of the following equation based on the calculated total throughput (Mbps).

$$D = (\text{total throughput}) \times (\text{transmission period})/(\text{transmission data amount per vehicle})$$

Figure 13:
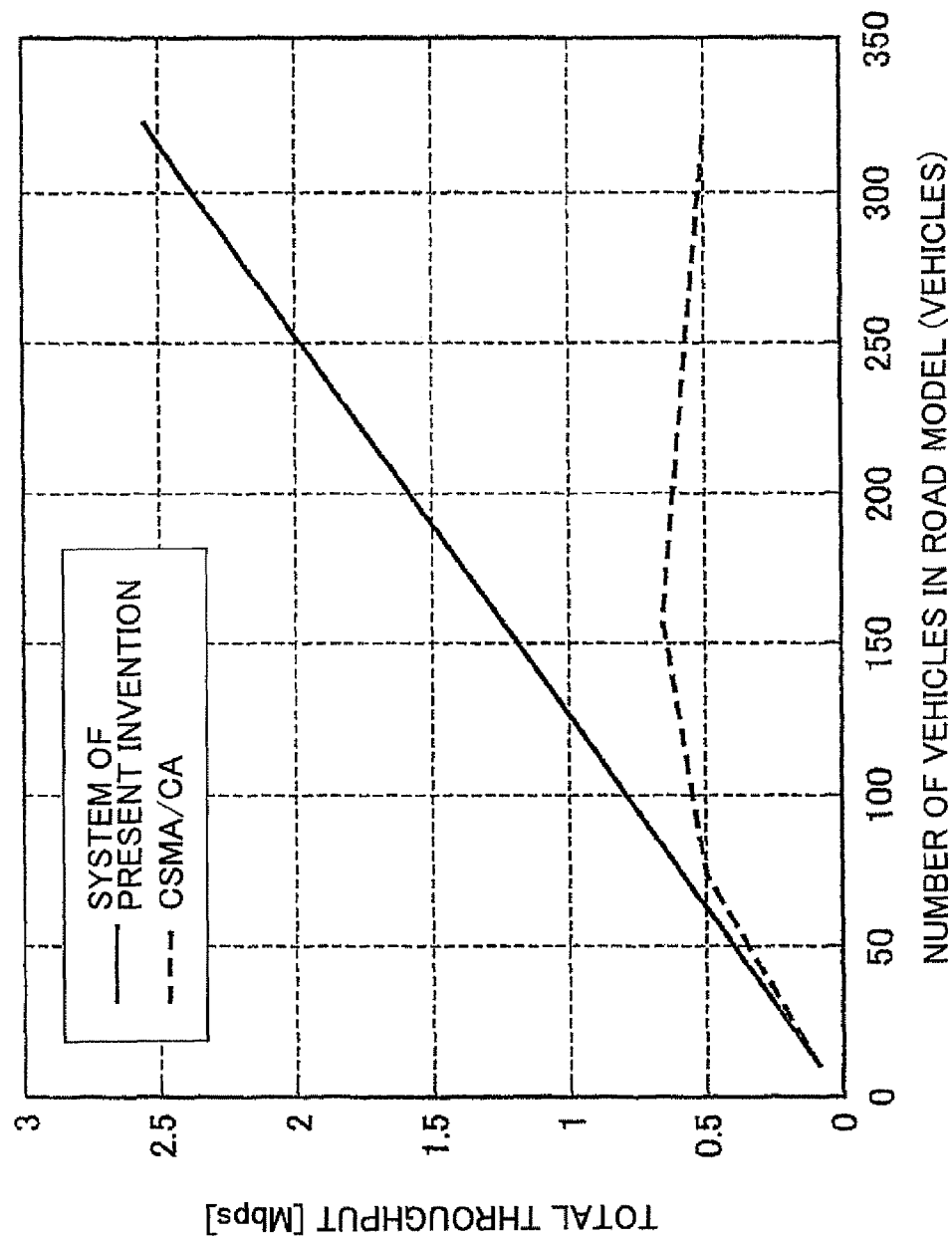
FIG. 13 illustrates an example of evaluation results obtained by the evaluation method of FIG. 12.

FIG. 13 illustrates simulation results indicating the variation of the total throughput with respect to the number of vehicles in the road model of FIG. 12.

In FIG. 13, the CSMA/CA method indicates the result of evaluation using the road model of FIG. 12, assuming that the carrier sense level is −93 dBm (SINR=3 dB).

In the CSMA/CA method, the total throughput is saturated when the number of vehicles in the road model is beyond 150. Meanwhile, in the inter-vehicle communication system 10, even if the number of vehicles in the road model increases, the total throughput rises. By calculating the number D of vehicles from which data is received, the number D of vehicles from which data is received among the 300 vehicles in the road model is 300 (=2.4×10⁶×0.1/800) in the inter-vehicle communication system 10, and 62 (=0.5×10⁶×0.1/800) in the CSMA/CA method. Accordingly, it is found that the number D of vehicles from which data is received in the inter-vehicle communication system 10 is approximately five times that in the CSMA/CA method. Accordingly, the inter-vehicle communication system 10 can solve the hidden terminal problem.

According to one aspect of the present invention, a mobile station communication device, an inter-mobile station communication system, and an inter-mobile station communication method are capable of solving the hidden terminal problem.

The present invention is not limited to the specific embodiments of the mobile station communication device, the inter-mobile station communication system, and the inter-mobile station communication method described herein, and variations and modifications may be made without departing from the scope of the present invention.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system in which wireless communication is performed between mobile stations, the communication system comprising:
    each of the mobile stations including,
        a mobile station position detecting unit configured to detect a present position of the mobile station in which the mobile station position detecting unit is included,
        a processor configured to set a transmission resource according to a present position of the mobile station in which the processor is included, the transmission resource being set based on transmission resource association information including different transmission resources assigned to plural assignment areas provided at different positions along a road through which the mobile station in which the transmission resource setting unit is included passes,
        a transmitter configured to transmit data with the use of the transmission resource that has been set, and
        a receiver configured to receive data transmitted from another mobile station,
    wherein a transmission/reception distance set for performing transmission and reception between the mobile stations is specified in advance, the plural assignment areas to which the different transmission resources are assigned are provided in a first area, a second area is provided outside the first area, the second area including plural assignment areas to which the same transmission resources as those of the first area are assigned, and a distance between an assignment area in the first area and an assignment area in the second area using the same transmission resource is greater than two times that of the transmission/reception distance.

2. The communication system according to claim 1, wherein the transmission resource is determined by at least one method among time division multiplexing, frequency division multiplexing, and code division multiplexing.

* * * * *